United States Patent
Chun et al.

(10) Patent No.: US 8,642,500 B2
(45) Date of Patent: Feb. 4, 2014

(54) METHOD FOR MANUFACTURING IRON CATALYST

(75) Inventors: Dong Hyun Chun, Daejeon-si (KR); Hak Joo Kim, Daejeon-si (KR); Ho Tae Lee, Daejeon-si (KR); Jung Il Yang, Daejeon-si (KR); Jung Hoon Yang, Daejeon-si (KR); Heon Jung, Daejeon-si (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 13/318,198

(22) PCT Filed: Nov. 19, 2010

(86) PCT No.: PCT/KR2010/008216
§ 371 (c)(1),
(2), (4) Date: Dec. 14, 2011

(87) PCT Pub. No.: WO2012/067291
PCT Pub. Date: May 24, 2012

(65) Prior Publication Data
US 2013/0237410 A1    Sep. 12, 2013

(51) Int. Cl.
*B01J 21/00* (2006.01)

(52) U.S. Cl.
USPC ...................................................... 502/245

(58) Field of Classification Search
None
See application file for complete search history.

(56) References Cited
U.S. PATENT DOCUMENTS
2009/0075814 A1*    3/2009    Duvenhage et al. .......... 502/245

OTHER PUBLICATIONS

Hisanori Ando, Qiang Xu, Masahiro Fujiwara, Yasuyuki Matsumura, Mutsuo Tanaka, Yoshie Souma, Hydrocarbon synthesis from CO2 over Fe-Cu catalysts, Oct. 19, 1998, Catalysis Today, vol. 45, Issues 1-4, p. 229-234.*

Shi-Run Yan, Ki-Won Jun, Ji-Sook Hong, Myoung-Jae Choi, Kyu-Wan Lee, Promotion effect of Fe-Cu catalyst for the hydrogenation of CO2 and application to slurry reactor, Mar. 13, 2000, Applied Catalysis A: Generall, vols. 194-195, pp. 63-70.*

Douglass G. Miller, Martin Moskovits , A study of the effects of potassium addition to supported iron catalysts in the Fischer-Tropsch reaction, J. Phys. Chem., 1988, 92 (21), pp. 6081-6085.*

Ali A. Mirzaei, Razieh Habibpour, Mostafa Faizi, Eslam Kashi, Characterization of iron-cobalt oxide catalysts: Effect of different supports and promoters upon the structure and morphology of precursors and catalysts, Applied Catalysis A: General, vol. 301, Issue 2, Feb. 24, 2006, pp. 272-283.*

* cited by examiner

*Primary Examiner* — Colleen Dunn
*Assistant Examiner* — Haytham Soliman
(74) *Attorney, Agent, or Firm* — Dority & Manning, P.A.

(57) ABSTRACT

Disclosed is a method for manufacturing an iron catalyst, the method including: a mixing stage where a mixture solution is manufactured by mixing iron nitrate ($Fe(NO_3)_3$) solution and copper nitrate ($Cu(NO_3)_2$) solution; a precipitation slurry-forming stage where a precipitation slurry is formed by adding at least one of sodium carbonate ($Na_2CO_3$) or sodium hydroxide ($Na_2CO_3$) solutions to the mixture solution; a washing stage where the precipitation slurry is filtered and washed with distilled water; a silica adding stage where fumed silica powder and potassium carbonate ($K_2CO_3$) solution are added to the precipitation slurry and then agitated; a drying stage where the precipitation slurry is passed through a sieve having a size of 30 μm to 100 μm and dried by a spry drying method to manufacture a powdered iron catalyst; and a heat treatment stage where the iron catalyst is dried at a temperature of 50° to 150° C., and then heat-treated at a temperature of 300° C. to 500° C.

17 Claims, 5 Drawing Sheets

METHOD FOR MANUFACTURING IRON CATALYST

CROSS REFERENCE TO RELATED APPLICATION

This application is the national stage entry of International Patent Application No. PCT/KR2010/008216 having a filing date of Nov. 19, 2010, the entire contents of which are incorporated herein by reference.

BACKGROUND OF THE INVENTION (a) Field of the Invention

The present invention relates to a method for manufacturing an iron catalyst, and more particularly to a method for manufacturing an iron catalyst, in which iron, silica, cobalt, etc are mixed in an optimum ratio so that a manufacturing process can be simplified and a manufacturing time is largely shortened, and a condition for each process is optimized so that a major indicator for evaluating performance of a catalyst, such as a CO conversion rate, $C_{5+}$ selectivity, etc. can be significantly higher than that of a conventional catalyst, thereby manufacturing a very excellent catalyst.

(b) Description of the Related Art

A conventional catalyst has been manufactured by various methods, but has a problem of low productivity since a catalyst manufacturing process itself is complicated and many processes are added for improving the performance of the catalyst.

Also, a washing process using a lot of distilled water or the like is indispensable for removing residues, and therefore there has been an environmental pollution.

Further, there have been required an effort to enhance various indicators for the most significant characteristic of the catalyst, i.e., a CO conversion rate, $C_{5+}$ selectivity, etc., and improvement in a manufacturing process to enhance such catalyst performance with at low cost while enhancing the productivity.

SUMMARY OF THE INVENTION

Accordingly, the present invention is conceived to solve the forgoing problems, and an aspect of the present invention is to manufacture an iron catalyst remarkably improved in reactivity of synthesizing reaction by mixing iron, copper, potassium, cobalt, sodium, silica, etc. in an optimum ratio.

Another aspect of the present invention is to provide a method for manufacturing an iron catalyst which is not only environment-friendly and economical since the amount of distilled water needed for filtering and washing is reduced by 80% or more, but also excellent in productivity since time taken in the filtering and washing can be markedly shortened into 15 hours to the maximum of 2 hours, as a proper amount of sodium naturally remains in the catalyst during a manufacturing process unlike the conventional method.

Still another aspect of the present invention is to provide a method for manufacturing an iron catalyst, general performance of which is improved by 2 to 4 times even though silica content is relatively low as compared with residual sodium as cobalt is added unlike the conventional method.

Yet another aspect of the present invention is to provide a method for manufacturing an iron catalyst which is very excellent since a major indicator for evaluating performance of a catalyst, such as a CO conversion rate, $C_{5+}$ selectivity, etc. is significantly higher than that of a conventional catalyst, by carrying out a slurry-forming process, a washing process, a heat treatment process, etc. in sequence and optimizing a condition for each process.

An exemplary embodiment of the present invention provides a method for manufacturing an iron catalyst, the method including: a mixing stage where a mixture solution is manufactured by mixing iron nitrate ($Fe(NO_3)_3$) solution and copper nitrate ($Cu(NO_3)_2$) solution; a precipitation slurry-forming stage where a precipitation slurry is formed by adding at least one of sodium carbonate ($Na_2CO_3$) or sodium hydroxide ($Na_2CO_3$) solutions to the mixture solution; a washing stage where the precipitation slurry is filtered and washed with distilled water; a silica adding stage where fumed silica powder and potassium carbonate ($K_2CO_3$) solution are added to the precipitation slurry and then agitated; a drying stage where the precipitation slurry is passed through a sieve having a size of 30 μm to 100 μm and dried by a spry drying method to manufacture a powdered iron catalyst; and a heat treatment stage where the iron catalyst is dried at a temperature of 50° C. to 150° C., and then heat-treated at a temperature of 300° C. to 500° C.

In the silica adding stage, cobalt solution may be further added.

In the mixing stage, copper contained in the copper nitrate solution may include 3 to 10 parts by weight with respect to 100 parts by weight of iron contained in the iron nitrate solution, and a mixing temperature may range from 70 to 90° C.

In the precipitation slurry-forming stage, at least one of sodium carbonate or sodium hydroxide may have a concentration of 1 mol/L to 5 mol/L, a precipitation slurry forming time may range from 80 minutes to 120 minutes, a precipitation forming temperature may range from 70° C. to 90° C., and a pH of the precipitation slurry preferably may range from 7 to 9.

The washing stage may be carried out once or twice in a row, sodium may remain in the precipitation slurry after the washing stage, and the sodium may include 1 to 5 parts by weight with respect to 100 parts by weight of iron contained in the precipitation slurry.

In the silica adding stage, the fumed silica powder may include particles having an average size of 5 nm to 20 nm, a content of silica contained in the fumed silica powder may include 15 to 50 parts by weight with respect to 100 parts by weight of iron contained in the iron nitrate solution, a content of potassium contained in the potassium carbonates solution may include 3 to 6 parts by weight with respect to 100 parts by weight of iron contained in the iron nitrate solution, agitating time may range from 8 to 14 hours, and the precipitation slurry may have a temperature of 15° C. to 30° C.

In the drying stage, solid particles in the precipitation slurry may have a concentration of 100 g/L to 300 g/L; for the spry drying method, an inlet temperature may range from 200° C. to 400° C., and an outlet temperature may range from 90° C. to 120° C.

In the heat treatment stage, drying time may range from 30 minutes to 10 hours, and heat treatment time may range 6 hours to 10 hours.

Cobalt contained in the cobalt solution may include 2 to 4 parts by weight with respect to 100 parts by weight of iron contained in the iron nitrate solution.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Hereinafter, a method for manufacturing an iron catalyst according to exemplary embodiments will be described in detail with reference to accompanying drawings. The present invention will become better understood with reference to the following exemplary embodiment, but these exemplary embodiments are just given for an example and do not restrict the scope of the invention defined by the appended claims.

Figure 1:
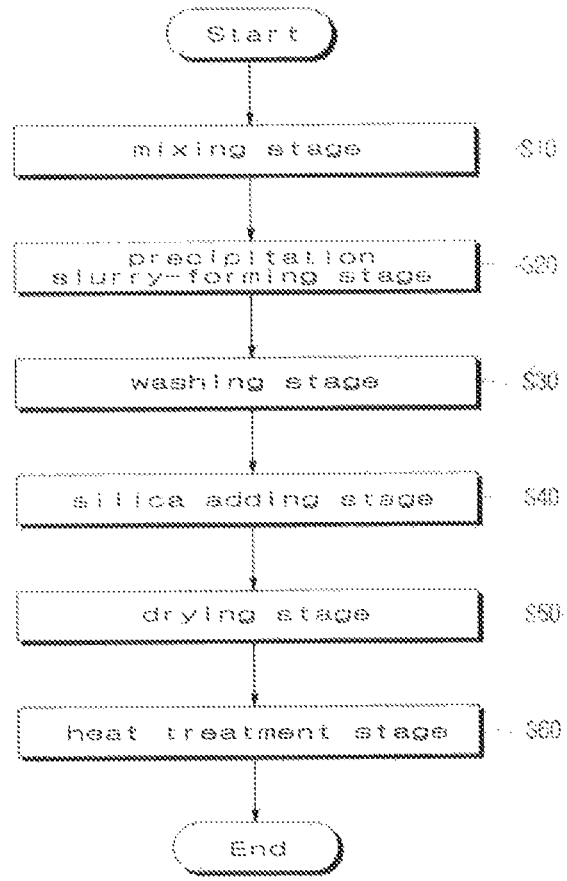
FIG. 1 is a flowchart sequentially showing a method for manufacturing an iron catalyst.

As shown in FIG. 1, a method for manufacturing an iron catalyst includes a mixing stage S10, a precipitation slurry-forming stage S20, a washing stage S30, a silica adding stage S40, a drying stage S50, and a heat treatment stage S60.

Here, the mixing stage S10 refers to a stage of manufacturing a mixture solution by mixing iron nitrate ($Fe(NO_3)_3$) solution and copper nitrate ($Cu(NO_3)_2$) solution. This is a process for manufacturing raw solution that forms the basis of the iron catalyst according to the present invention.

In the mixing stage S10, 3 to 10 parts by weight of copper contained in the copper nitrate solution is preferable with respect to 100 parts by weight of iron contained in the iron nitrate solution. More preferably, copper may be 4 to 6 parts by weight. If copper is less than 3 parts by weight or more than 10 parts by weight, catalyst performance such as a CO conversion rate, $C_{5+}$ selectivity, etc. is largely lowered.

Also, in the mixing stage S10, a preferable mixing temperature may range 70° C. to 90° C. More preferably, a mixing temperature of 78° C. to 82° C. is effective. If the mixing temperature is lower than 70° C., the iron nitrate solution and the copper nitrate solution may not be effectively mixed and dispersed. On the other hand, if the mixing temperature is higher than 90° C., the solutions are mixed at an improper concentration due to an evaporation effect.

Next, the precipitation slurry-forming stage S20 refers to a stage where a precipitation slurry is formed by adding at least one of sodium carbonate ($Na_2CO_3$) or sodium hydroxide ($Na_2CO_3$) solutions to the mixture solution. This is a process of applying a precipitator to the mixture solution and acquiring slurry.

Here, at least one of sodium carbonate ($Na_2CO_3$) or sodium hydroxide ($Na_2CO_3$) solutions preferably has concentration of 1 mol/L to 5 mol/L. More preferably, concentration of 1.5 mol/L to 2.5 mol/L is effective. If the concentration is lower than 1 mol/L, much time is taken in filtering and washing since a large amount of solution is used. If the concentration is higher than 5 mol/L, the performance of the catalyst is lowered since a fine hole structure of the precipitation cannot be developed into porosity.

Also, in the precipitation slurry-forming stage S20, 80 minutes to 120 minutes are taken in forming the precipitation slurry, and precipitation forming temperature preferably ranges from 70° C. to 90° C. More preferably, the formation time of 95 minutes to 105 minutes and the formation temperature of 78° C. to 82° C. are effective. If the formation time and the formation temperature are out of the foregoing formation time and the foregoing formation temperature, it is difficult to effectively form the fine hole structure of the precipitation slurry.

Further, the pH of the precipitation slurry preferably ranges from 7 to 9. More preferably, the pH of 7.8 to 8.2 is effective. If the pH is less than 7 or more than 9, it is difficult to form the precipitation slurry.

Next, the washing stage S30 refers to a stage where the precipitation slurry is filtered and washed with distilled water. This is a process of removing unnecessary ions such as sodium, carbonate, nitrate ions, thereby not only improving the performance of the catalyst but also suppressing unnecessary reactions during the reaction.

Here, the washing stage S30 may be preferably carried out once or twice in a row. If the washing stage is not carried out, the unnecessary ions such as sodium, carbonate, nitrate ions are present in the catalyst, thereby lowering the performance of the catalyst. If the washing stage is carried out three or more times, residual sodium is generally removed to be less than 1 part by weight as compared with 100 parts by weight of iron, so that sodium cannot serve as a promoter. Further, as the washing stage is repeated many times, the amount of distilled water for the washing stage increases rapidly and washing time is also markedly prolonged, thereby decreasing the economic feasibility and efficiency of the total processes.

Figure 2:
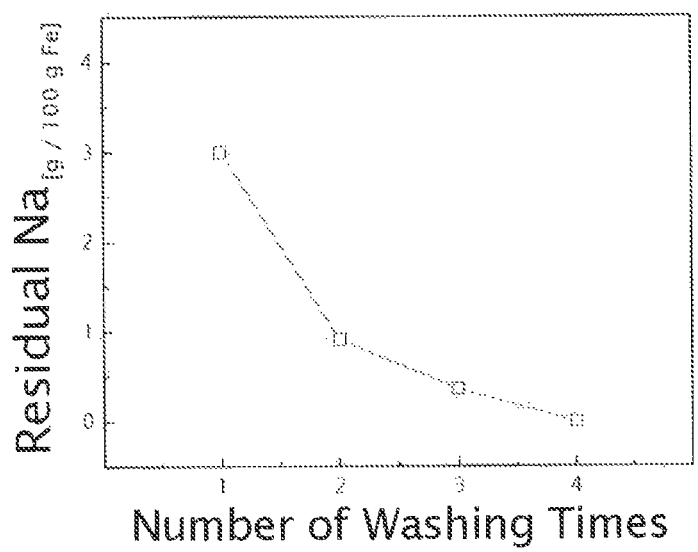
FIG. 2 is a graph showing comparison in residual sodium contents according to how many times a washing stage is repeated.
Figure 3:
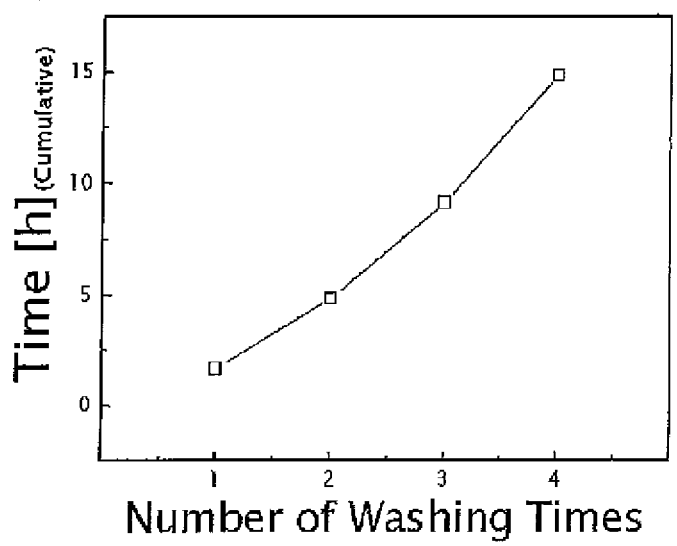
FIG. 3 is a graph showing comparison in time taken according to how many times a washing stage is repeated.

A result from the above optimized processes can be proved experimental results shown in FIGS. 2 and 3. As shown in FIG. 2, if the washing stage is repeated three or more times, it is understood that residual sodium content is decreased rapidly. Further, as shown in FIG. 3, if the washing stage is repeated three or more times, it is understood that the washing time is rapidly increased into 10 or more hours.

Also, it is preferable that residual sodium is present in the precipitation slurry after the washing stage S30. 1 to 5 parts by weight of sodium contained is preferable with respect to 100 parts by weight of iron contained in the precipitation slurry. More preferably, sodium may be 2 to 3 parts by weight.

Conventionally, impurities are completely removed by the washing stage. However, according to an exemplary embodiment of the present invention, only sodium remains as needed and serves as a promoter. As the washing stage is reduced, it is environment-friendly since the amount of distilled water needed for washing can be reduced by 80% or more as compared with that of the conventional case. Further, it is economical since time taken in the washing can be markedly shortened by 80% or more.

Thus, in this exemplary embodiment of the present invention, sodium remains in the precipitation slurry even after the washing stage. Specifically, if sodium content is less than 1 part by weight with respect to 100 parts by weight of iron contained in the precipitation slurry, improvement in the performance of the catalyst due to sodium is insignificant. On the other hand, if sodium content is more than 5 parts by weight, the residual sodium lowers the performance of the catalyst.

According to conventional general researches, the residual sodium remaining in the iron catalyst was believed to have a bad influence on the performance of the catalyst, and thus inevitably removed by a lot of washing processes.

Such a conventional research result has been definitely described in the paper titled "the negative effect of residual sodium on iron-based catalyst for Fischer-Tropsch synthesis" in Journal of Molecular Catalysis A: Chemical, Volume 263, (2007), pages 266-272, disclosed in the ScienceDirect database.

However, on the contrary to the conventional research results, the present invention has discovered that the optimum content of residual sodium can improve the performance of the catalyst, and thus conceived a method for manufacturing an optimum iron catalyst.

The improvement in the performance of the catalyst due to the content of sodium can be clearly proved through the following experiments.

Next, the silica adding stage S40 refers to a stage where fumed silica powder and potassium carbonate ($K_2CO_3$) solution are added to the precipitation slurry and then agitated. This is a process for effectively and uniformly mixing the precipitation slurry with silica and potassium carbonate.

Here, silica is a kind of fumed silica and provided in the form of powder. It was ascertained through several experimental results that the performance of the iron catalyst can be remarkably improved by adding the fumed silica powder having an optimum particle size rather than colloidal type of silica or potassium silicate. These experimental results are shown in the following.

Here, the fumed silica powder may be particles having an average size of 5 nm to 20 nm. Preferably, particles having an size of 8 nm to 12 nm is effective, More preferably, particles having an size of 11 nm is effective. If the size of the particle is less than 5 nm, bonding force between the catalyst and silica is so high that the performance of the catalyst can be lowered. On the other hand, if the size of the particle is more than 20 nm, the effect of silica is so insignificant that the performance of the catalyst can be lowered.

Also, the content of silica contained in the fumed silica powder may be 15 to 50 parts by weight with respect to 100 parts by weight of iron contained in the iron nitrate solution. Preferably, 25 to 35 parts by weight of silica is effective. If silica is less than 15 parts by weight, the performance of the catalyst is lowered since silica is small in quantity. On the other hand, if silica is more than 50 parts by weight, the performance of the iron catalyst is generally lowered since the silica is excessively large in quantity as compared with residual sodium.

Also, in the silica adding stage S40, the content of potassium contained in the carbonate solution may be 3 to 6 parts by weight with respect to 100 parts by weight of iron contained in the iron nitrate solution. Preferably, 4 to 5 parts by weight of potassium is effective. If potassium is less than 3 parts by weight or more than 6 parts by weight, the catalyst does not effectively work.

Further, in the silica adding stage S40, agitating time may range from 8 to 14 hours, and the precipitation slurry may have a temperature of 15° C. to 30° C. Preferably, it is effective when the agitating time is 12 hours and the temperature of the precipitation slurry ranges 20° C. to 25° C. If the agitating time is shorter than 8 hours or the temperature of the precipitation slurry is lower than 15° C., silica, precipitation slurry and potassium carbonate are not effectively dispersed and mixed and slurry has so high viscosity that a nozzle can be frequently clogged during a spray drying process, thereby decreasing efficiency of a manufacturing process. On the other hand, if the agitating time is longer than 14 hours or the temperature of the precipitation slurry is higher than 30° C., economic feasibility is lowered.

Also, in the silica adding stage S40, cobalt solution may be further added, in which cobalt may preferably have 2 to 4 parts by weight with respect to 100 parts by weight of iron contained in the iron nitrate solution. More preferably, 3 parts by weight of cobalt is effective.

If the content of cobalt is less than 2 parts by weight, the improvement in the catalyst performance is insignificant. On the other hand, if the content of cobalt is more than 4 parts by weight, the catalyst performance is not largely improved or is lowered.

Figure 4:
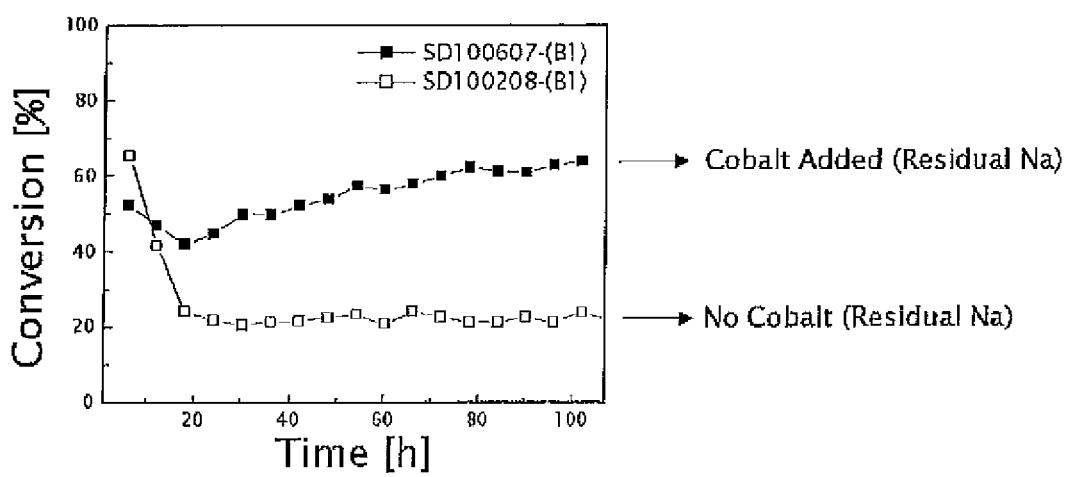
FIG. 4 is a graph showing comparison in a CO conversion rate between a catalyst with cobalt and a catalyst with no cobalt.

That is, the addition of cobalt remarkably improves the general performance of the catalyst, which is definitely shown in the experimental result of FIG. 4. Referring to FIG. 4, it will be understood that the CO conversion rate of the catalyst with cobalt is far higher than that without cobalt. Besides, a $H_2$ conversion rate and $CO_{5+}$ selectivity are also improved by 1.5 times when cobalt is added.

Next, the drying stage S50 refers to a stage where the precipitation slurry is passed through a sieve having a size of 30 μm to 100 μm and dried by a spry drying method to thereby manufacture a powdered iron catalyst. This is a process for drying cohesive particles of the precipitation slurry after pulverization, manufacturing a catalyst in which all ingredients are uniformly mixed, and effectively powdering it without lowering its performance.

Here, the size of the sieve applied to the precipitation slurry may range from 30 μm to 100 μm, may preferably range 50 μm to 70 μm, and may more preferably be 63 μm. If the size of the sieve is smaller than 30 μm, a production yield is significantly decreased because there are ingredients of which particles cannot be passed. On the other hand, if the size of the sieve is larger than 100 μm, the pulverization effect for the cohesive particles is remarkably decreased.

Also, in the drying stage S50, solid particles in the precipitation slurry may have a concentration of 100 g/L to 300 g/L. Preferably, the concentration of 150 g/L to 250 g/L is effective. If the concentration is lower than 100 g/L, the particles of the manufactured catalyst are too small to be applied to a slurry bubble column reactor using a filter. On the other hand, if the concentration is higher than 300 g/L, the viscosity of the slurry is so high that the nozzle can be frequently clogged during the spray drying process, thereby decreasing the efficiency of a manufacturing process.

The spray drying method refers to a general spray drying method. However, according to the present exemplary embodiment, an inlet temperature may range from 200° C. to 400° C., and an outlet temperature may range from 90° C. to 120° C. If the temperature is out of the foregoing temperatures, major ingredients are lost while drying the iron catalyst in the form of powder, and therefore the catalyst may be decreased in the general performance and dried not in the form of uniform powder.

Last, the heat treatment stage S60 refers to a stage where the iron catalyst is dried at a temperature of 50° C. to 150° C., and then heat-treated at a temperature of 300° C. to 500° C. This is a process for vaporizing and removing carbonate ions, nitrate ions or the like residual impurities, so that the catalyst can be manufactured with high purity and the fine hole structure of the catalyst can be finally determined.

Here, the iron catalyst powder may be primarily dried again at a temperature of 50° C. to 150° C., and preferably at a temperature of 80° C. to 90° C. If the temperature is lower than 50° C., the drying effect is insignificant. On the other hand, if the temperature is higher than 150° C., the economic feasibility is low. Preferably, the iron catalyst powder may be dried in an oven.

Also, drying time may range from 30 minutes to 10 hours. Preferably, 1 hours to 2 hours of the drying time are effective. The drying time is adjusted in connection with the drying temperature. The higher the drying temperature, the shorter the drying time. If the drying time is shorter than 30 minutes, the drying effect is insignificant, On the other hand, if the drying time is longer than 10 hours, the economic feasibility is lowered.

Also, in the heat treatment stage S60, the heat treatment may be finally performed at an atmosphere of 300° C. to 500° C. for 6 to 10 hours after the drying stage. This stage is a process for vaporizing impurities, chemically stabilizing the catalyst, and increasing physical strength of the catalyst. If the temperature is lower than 300° C., the impurities are not sufficiently vaporized and removed, and the physical strength of the catalyst is insignificantly increased. On the other hand, if the temperature is higher than 500° C., the fine hole structure of the catalyst may cave in.

Further, the heat treatment time may range from 6 to 10 hours, and may preferably range from 7.5 hours to 8.5 hours. If the heat treatment time is shorter than 6 hours, the impurities are not sufficiently removed, and the physical strength of the catalyst is also insignificantly increased. If the heat treatment time is longer than 10 hours, the economic feasibility is lowered and the fine hole structure of the catalyst cave in.

Hereinafter, the inventive example and the comparative example resulting from testing the performance of the iron catalyst manufactured according to the present invention and the characteristics of the iron catalyst manufactured uncomplying with the present invention will be examined.

Figure 5:
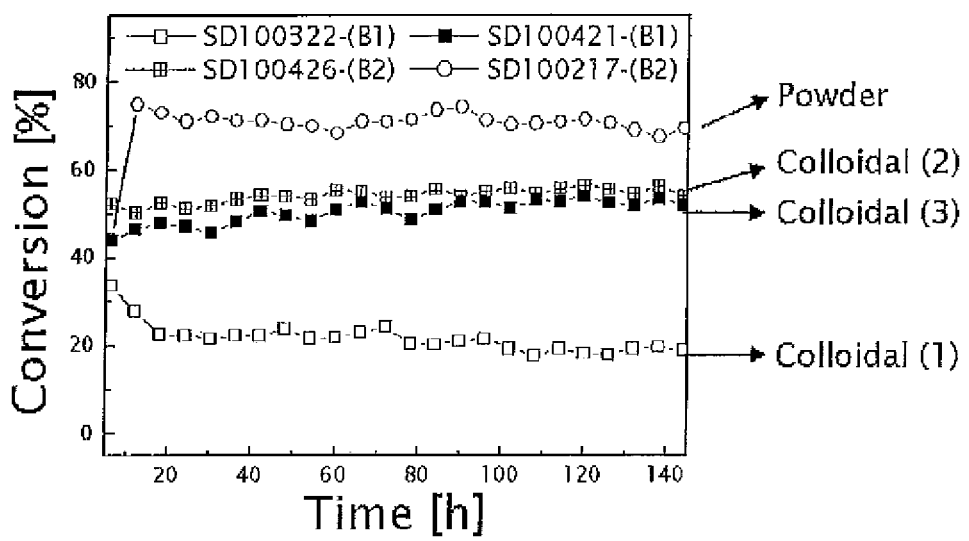
FIG. 5 is a graph showing comparison in a CO conversion rate between an inventive example using powdered silica and a comparative example using colloidal silica.

First, FIG. 5 is a graph showing comparison in the catalyst performance (CO conversion rate) between fumed silica of 11 nm (powder) according to the present invention, and conventional colloidal silica of 22 nm (colloidal (1)), 12 nm (colloidal (2)) and 7 nm (colloidal (3)).

Referring to FIG. 5, it will be appreciated that the catalyst manufactured using fumed silica of 11 nm (powder) is far more improved in the performance than other catalysts manufactured other silica by 20% or more.

Also, addition of silica according to the present invention causes productivity of liquid hydrocarbon to be 0.266 g/g$_{(cat)}$-h when, while other colloidal silica causes productivity of liquid hydrocarbon to be 0.0667~0.226 g/g$_{(cat)}$-h. Thus, it will be appreciated that the present invention is far superior.

Figure 6:
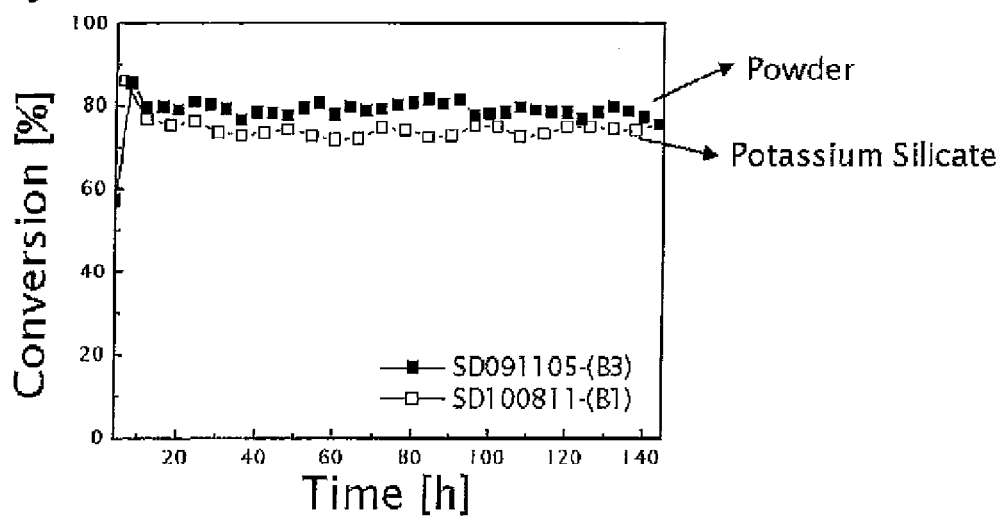
FIG. 6 is a graph showing comparison in a CO conversion rate between an iron catalyst manufactured using potassium silicate as a raw material of silica and an iron catalyst manufactured using silica powder.

Next, FIG. 6 is a graph showing comparison in performance between an iron catalyst manufactured using potassium silicate as a raw material of silica and an iron catalyst manufactured using silica powder according to the present invention. With this, it will be appreciated that the present invention is far superior in general performance.

However, potassium silicate has a limit to a manufacturable ratio of silica/potassium. Therefore, if silica content has to be increased in the catalyst, there are needed additional processes of adding an excessive amount of potassium silicate, removing the excessive amount of potassium through a washing process, etc. Accordingly, it will be definitely understood that not only the present invention is far superior in the catalyst performance but also the manufacturing process of the present invention is simple and economic.

Figure 7:
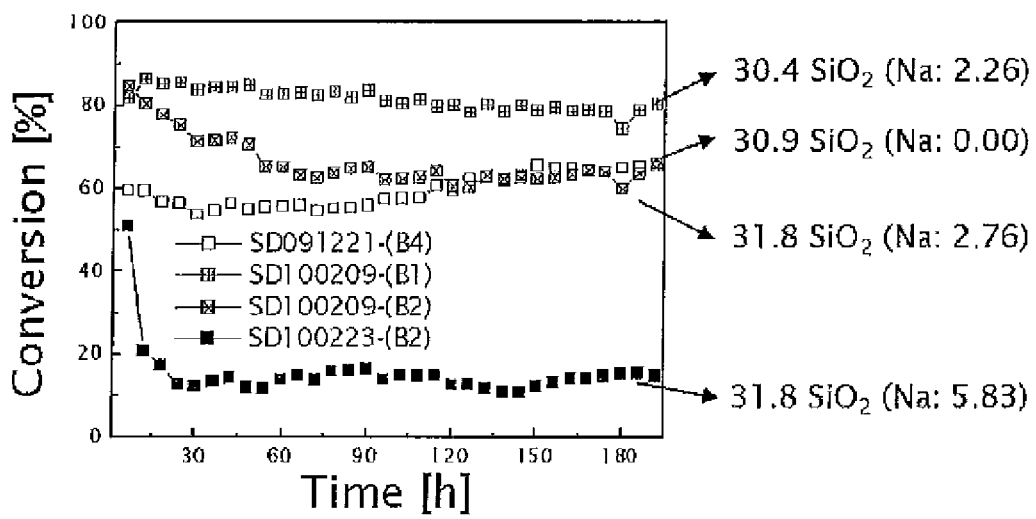
FIG. 7 is a graph showing comparison in a CO conversion rate of an iron catalyst according to residual sodium content with respect to silica content.
Figure 8:
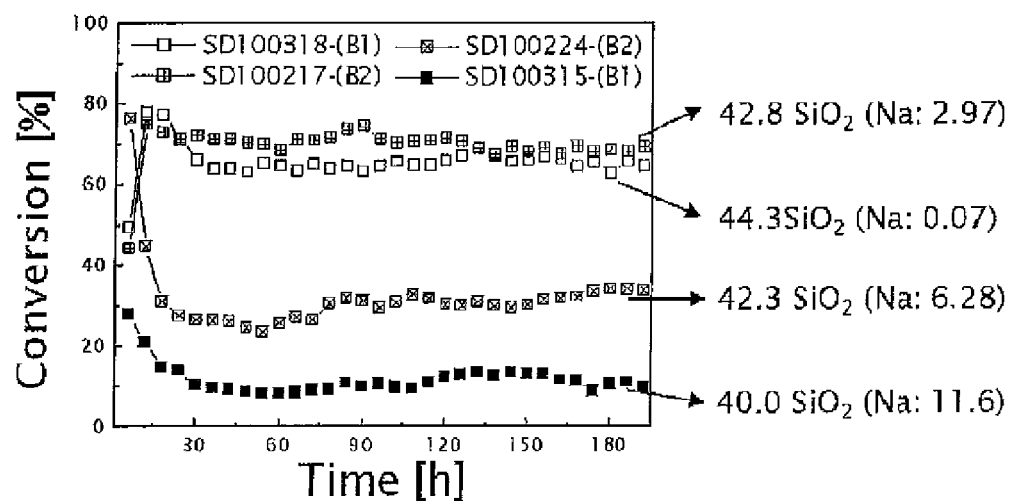
FIG. 8 is a graph showing comparison in a CO conversion rate of an iron catalyst according to residual sodium content with respect to silica content.

FIGS. 7 and 8 are experimental results about an optimum content of residual sodium with respect to the content of silica. As shown in FIGS. 7 and 8, when about 2 parts by weight of residual sodium is added, the performance of the catalyst is superior to that having no residual sodium. On the other hand, when residual sodium more than 5 parts by weight exists, the performance of the catalyst is lowered rapidly.

Also, when the silica content is about 30 to 45 parts by weight, about 2 to 3 parts by weight of residual sodium causes the productivity of liquid hydrocarbon to be 0.266-0.317 g/g$_{(cat)}$-h but no residual sodium causes the productivity of liquid hydrocarbon to be 0.213-0.228 g/g$_{(cat)}$-h. Thus, it will be definitely appreciated that the performance of the catalyst is far superior when the optimum content of residual sodium is contained therein.

Accordingly, residual sodium present within the optimum content range according to an exemplary embodiment the present invention can lead to the optimum performance of the catalyst.

Figure 9:
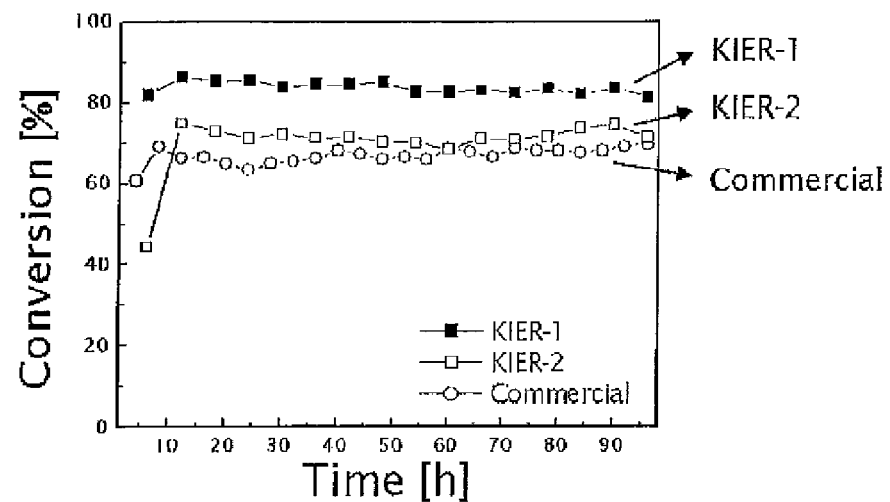
FIG. 9 is a graph showing comparison in a CO conversion rate between a catalyst (KIER-1,2) manufactured according to the present invention and a conventional commercial catalyst.
Figure 10:
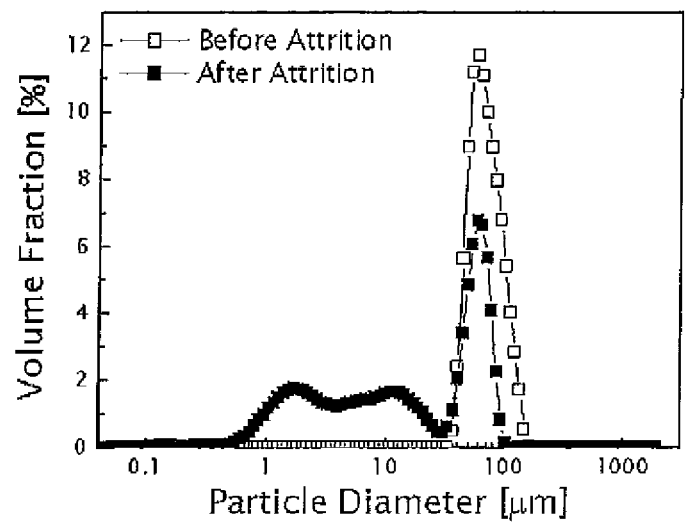
FIG. 10 is a graph showing attrition strength of the catalyst (KIER-1) manufactured according to the present invention.
Figure 11:
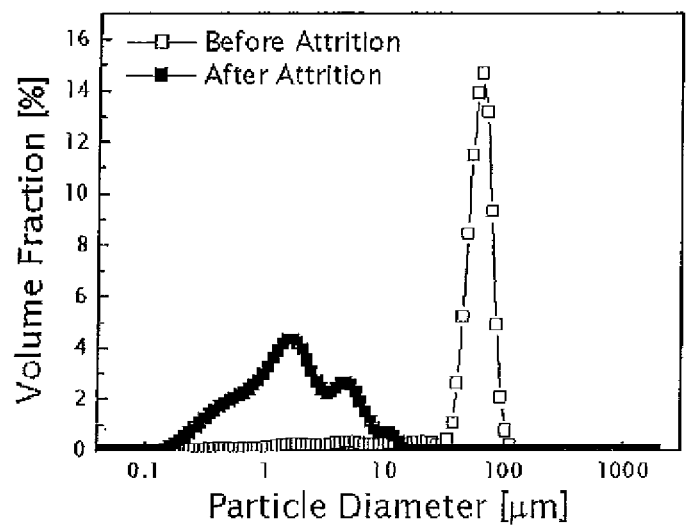
FIG. 11 is a graph showing attrition strength of the conventional commercial catalyst.

Meanwhile, FIGS. 9 to 11 are graphs showing comparison in the performance between a catalyst (KIER-1,2) manufactured according to the exemplary embodiment of the present invention and a conventional commercial catalyst. Referring to FIG. 9, the CO conversion rate of the catalyst manufactured according to the present invention is higher than that of the commercial catalyst. Further, the commercial catalyst causes the productivity of liquid hydrocarbon to be 0.219 g/g$_{(cat)}$-h, while the catalyst manufactured according to the preset invention causes the productivity of liquid hydrocarbon to be 0.266-0.317 g/g$_{(cat)}$-h. Thus, it will be appreciated that the performance of the catalyst manufactured according to the present invention is far superior to that of the conventional commercial catalyst.

FIGS. 10 and 11 are related to attrition strength, in which FIG. 10 shows the attrition strength of the catalyst manufactured according to the present invention, and FIG. 11 shows the attrition strength of the commercial catalyst. These were evaluated by the ASTM D5757 method. As shown in FIGS. 10 and 11, the commercial catalyst were mostly attrited and only small particles of 20 μm were found out after the attrition test, while 50% of the catalyst according to the present invention maintained the size of 20~180 μm after the attrition test. These results show that the catalyst manufactured according to the present invention is far superior to the commercial catalyst.

As described above, there is provided a method for manufacturing an iron catalyst remarkably improved in reactivity of synthesizing reaction by mixing iron, copper, potassium, cobalt, sodium, silica, etc. in an optimum ratio.

Also, there is provided a method for manufacturing an iron catalyst which is not only environment-friendly and economical since the amount of distilled water needed for filtering and washing is reduced by 80% or more, but also excellent in productivity since time taken in the filtering and washing can be markedly shortened into 15 hours to the maximum of 2 hours, as a proper amount of sodium naturally remains in the catalyst during a manufacturing process unlike the conventional method.

Further, there is provided a method for manufacturing an iron catalyst, general performance of which is improved by 2 to 4 times even though silica content is relatively low as compared with residual sodium as cobalt is added unlike the conventional method.

Further, there is provided a method for manufacturing an iron catalyst which is very excellent since a major indicator for evaluating performance of a catalyst, such as a CO conversion rate, $C_{5+}$ selectivity, etc. is significantly higher than that of a conventional catalyst, by carrying out a slurry-forming process, a washing process, a heat treatment process, etc. in sequence and optimizing a condition for each process.

While the exemplary embodiments of the present invention were described in detail with reference to the experimental examples, it is to be understood that the invention is not limited to the foregoing experimental examples, but, on the contrary, is intended to cover various modifications and equivalent arrangements included within the spirit and scope of the appended claims. Further, it will be appreciated by those skilled in the art that changes may be made in these exemplary embodiments without departing from the principles and spirit of the invention, the scope of which is defined in the appended claims and their equivalents.

The present invention relates to a method for manufacturing an iron catalyst, in which iron, silica, cobalt, etc are mixed in an optimum ratio so that a manufacturing process can be simplified and a manufacturing time is largely shortened, and a condition for each process is optimized so that a major indicator for evaluating performance of a catalyst, such as a CO conversion rate, C5+ selectivity, etc. can be significantly higher than that of a conventional catalyst, thereby manufacturing a very excellent catalyst, and it is thus industrially applicable.

What is claimed is:

1. A method for manufacturing an iron catalyst, the method comprising:
    a mixing stage where a mixture solution is manufactured by mixing iron nitrate ($Fe(NO_3)_3$) solution and copper nitrate ($Cu(NO_3)_2$) solution;
    a precipitation slurry-forming stage where a precipitation slurry is formed by adding at least one of sodium carbonate ($Na_2CO_3$) or sodium hydroxide (NaOH) solutions to the mixture solution;
    a washing stage where the precipitation slurry is filtered and washed with distilled water;
    a silica adding stage where fumed silica powder and potassium carbonate ($K_2CO_3$) solution are added to the precipitation slurry and then agitated, wherein the fumed silica powder comprises particles having an average size of 5 nm to 20 nm;
    a drying stage where the precipitation slurry is passed through a sieve having a size of 30 μm to 100 μm and dried by a spry drying method to manufacture a powdered iron catalyst; and
    a heat treatment stage where the iron catalyst is dried at a temperature of 50° C. to 150° C., and then heat-treated at a temperature of 300° C. to 500° C.

2. The method according to claim 1, wherein in the silica adding stage, cobalt solution is further added.

3. The method according to claim 1, wherein in the mixing stage, copper contained in the copper nitrate solution comprises 3 to 10 parts by weight with respect to 100 parts by weight of iron contained in the iron nitrate solution.

4. The method according to claim 1, wherein in the mixing stage, a mixing temperature ranges from 70° C. to 90° C.

5. The method according to claim 1, wherein in the precipitation slurry-forming stage, at least one of sodium carbonate or sodium hydroxide has a concentration of 1 mol/L to 5 mol/L.

6. The method according to claim 1, wherein in the precipitation slurry-forming stage, a precipitation slurry forming time ranges from 80 minutes to 120 minutes, and a precipitation forming temperature ranges from 70° C. to 90° C.

7. The method according to claim 1, wherein in the precipitation slurry-forming stage, a pH of the precipitation slurry preferably ranges from 7 to 9.

8. The method according to claim 1, wherein the washing stage is carried out once or twice in a row.

9. The method according to claim 1, wherein in the washing stage, sodium remains in the precipitation slurry after the washing stage, and the sodium comprises 1 to 5 parts by weight with respect to 100 parts by weight of iron contained in the precipitation slurry.

10. The method according to claim 1, wherein in the silica adding stage, a content of silica contained in the fumed silica powder comprises 15 to 50 parts by weight with respect to 100 parts by weight of iron contained in the iron nitrate solution.

11. The method according to claim 1, wherein in the silica adding stage, a content of potassium contained in the potassium carbonates solution comprises 3 to 6 parts by weight with respect to 100 parts by weight of iron contained in the iron nitrate solution.

12. The method according to claim 1, wherein in the silica adding stage, agitating time ranges from 8 to 14 hours, and the precipitation slurry has a temperature of 15° C. to 30° C.

13. The method according to claim 1, wherein in the drying stage, solid particles in the precipitation slurry have a concentration of 100 g/L to 300 g/L.

14. The method according to claim 1, wherein in the drying stage for the spry drying method, an inlet temperature ranges from 200° C. to 400° C., and an outlet temperature ranges from 90° C. to 120° C.

15. The method according to claim 1, wherein in the heat treatment stage, drying time ranges from 30 minutes to 10 hours.

16. The method according to claim 1, wherein in the heat treatment stage, heat treatment time ranges 6 hours to 10 hours.

17. The method according to claim 2, wherein cobalt contained in the cobalt solution comprises 2 to 4 parts by weight with respect to 100 parts by weight of iron contained in the iron nitrate solution.

\* \* \* \* \*